Sept. 3, 1929.  R. L. HAWKINS  1,726,826
VIBRATION DAMPER
Original Filed Dec. 5, 1925   2 Sheets-Sheet 2
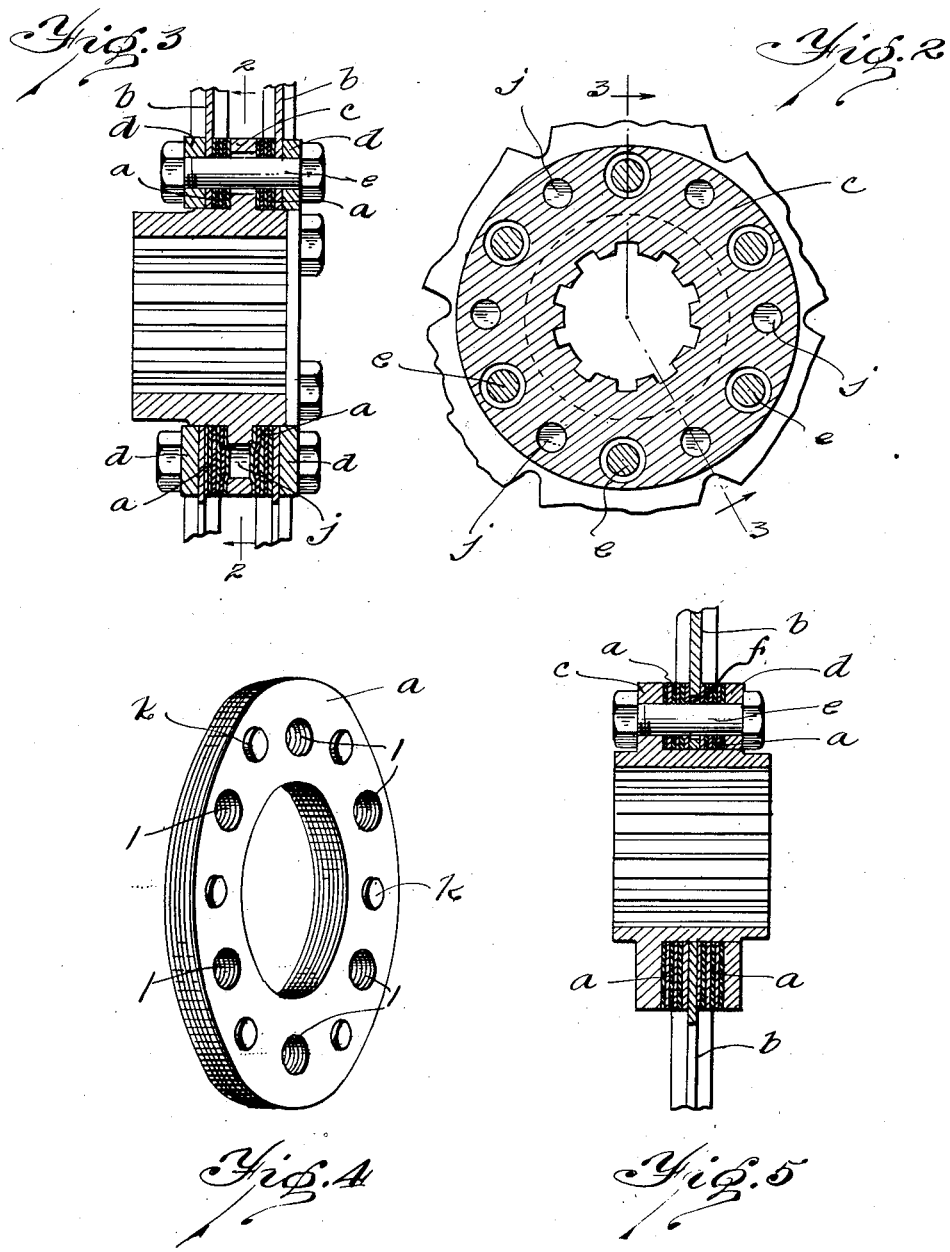
INVENTOR.
Raymond L. Hawkins
BY
Stuart C. Barnes
ATTORNEY.

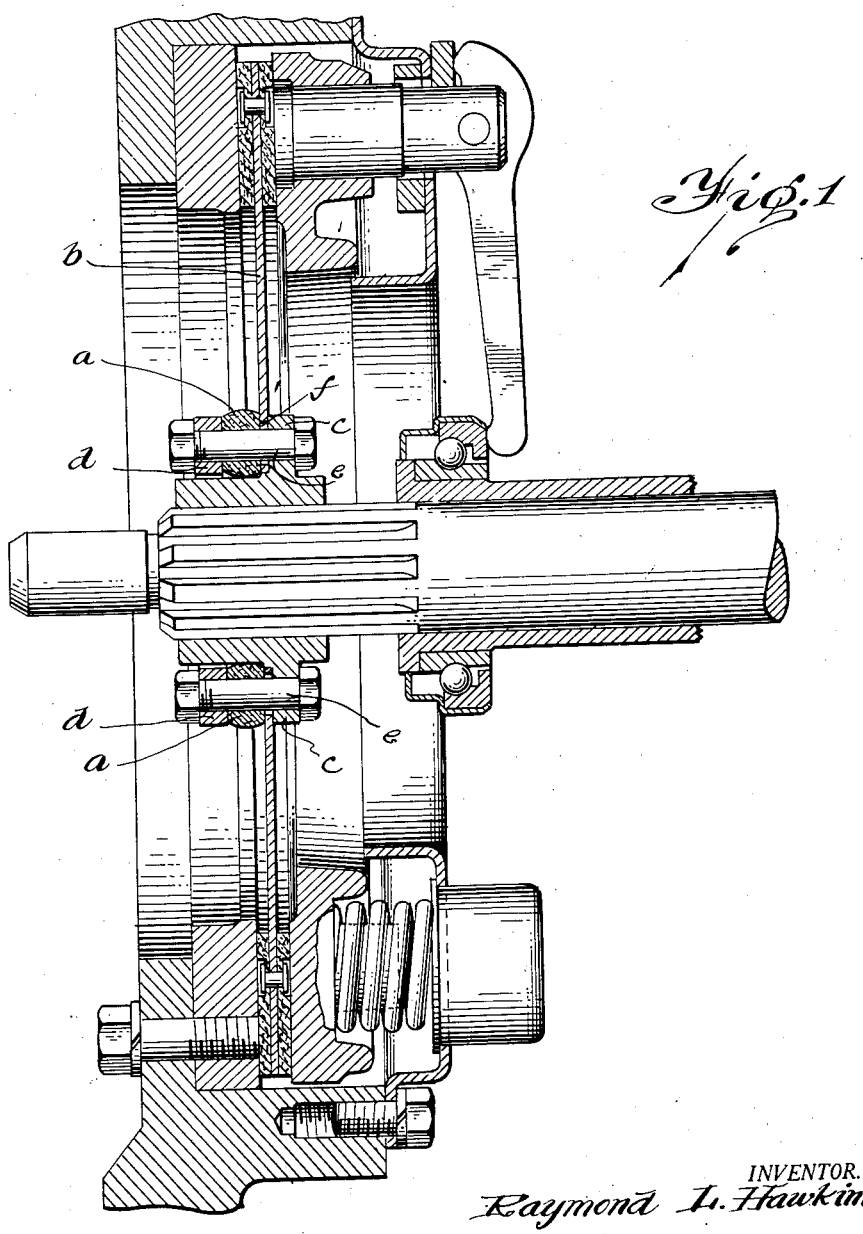

Patented Sept. 3, 1929.

1,726,826

UNITED STATES PATENT OFFICE.

RAYMOND L. HAWKINS, OF DETROIT, MICHIGAN, ASSIGNOR TO LONG MANUFACTURING COMPANY, OF DETROIT, MICHIGAN, A CORPORATION OF MICHIGAN.

VIBRATION DAMPER.

Original application filed December 5, 1925, Serial No. 73,460, and in Canada December 18, 1925.
Divided and this application filed December 14, 1926. Serial No. 154,761.

This invention relates to clutches. It is the object of the invention to provide a nonmetallic deformable element between the driven disc and its hub of such a character that it will not permit the driven disc to wobble or move out of its plane, and which nevertheless will dampen vibrations and ease the shock when sudden changes are made in the load. Furthermore, this element permits a nice adjustment of the disc to make it run in its proper plane. Preferably the elements are so arranged that a slight amount of yield is permitted, which is calculated to dampen vibrations and relieve the shocks. This will be more fully explained hereinafter.

This application is a division of application Serial No. 73,460, filed December 5, 1925.

Referring to the drawings:

Fig. 1 is a longitudinal section of a clutch equipped with my improvement.

Figs. 2 and 3 are sectional views showing the hub and disk connections, and showing how the yieldable element may be provided with projecting spots for cooperating with recesses in an adjacent member; Fig. 2 being a section on line 2—2 of Fig. 3, and Fig. 3 being a section on line 3—3 of Fig. 2.

Fig. 4 is a somewhat enlarged perspective view of the yieldable element provided with projecting spots.

Fig. 5 is a view showing a structure which includes a single driven disk and hub in which the yieldable member with projecting spots may be used.

It is not broadly new to insert a flexible element between the driven disc and its hub. This has been accomplished by supporting the driven disc by means of a yieldable ring on the hub. This construction, however, has been objectionable for the reason that it allows the disc to yield sidewise as well as torsionally, and results in an undesirable wobbling of the disc. My present invention gives the necessary yield torsionally, but does not permit any sidewise movement of the disc by reason of such connection.

To this end I bolt a yieldable ring $a$ up against the driven disc $b$ where the center of this disc abuts the hub collar $c$. Preferably a metallic ring $d$ is used to jam this cushioning ring $a$ against the center of this disc. The ring $a$ shown in Fig. 1 is a plain ring of deformable material such as rubber, while the rings shown in Figs. 3, 4 and 5 are rubber impregnated fabric.

Preferably where the bolts $e$ pass through the center of the disc I leave considerable clearance, say $\frac{1}{16}$th of an inch on each side of the bolt at the perforation $f$. These bolts are drawn up very tightly, and consequently the deformable ring is tightly clamped against the driven disc. This deformable ring is preferably constructed of fabric discs vulcanized together. In the form of the invention shown in Figs. 2, 3 and 4, the face of the deformable ring is provided with spots $k$ adapted to fit in openings $j$ of the collar $c$ of the hub. This gives a little more positive resistance to slippage. In this form, the construction is shown as consisting of two clutch disc members and two yieldable members, one for each disc. The collar of the hub is provided with enlarged holes to permit movement of the bolts therein. However, the idea of utilizing the projecting spots and cooperating openings, or recesses, can be embodied in the form as shown in Fig. 1, wherein but a single yieldable element and single disc is used. Likewise, this modified form can be embodied in such a construction as shown in Fig. 5 wherein a single disc member is engaged on opposite sides by yieldable elements.

It will be apparent that with the deformable ring located as it is, that the driven disc is tightly clamped against lateral movement, that there is permitted a certain amount of yield torsionally resisted by the surface distortion of the deformable ring, especially in view of the small amount of lost motion permitted. This torsional yield not only relieves the sudden shocks by sudden changes of the load, but also dampens the vibrations in the driven parts to the rear of the motor so that these cannot reach a periodicity with the vibrations of the motor and set up very objectionable vibrations throughout the chassis and running gear. Furthermore, it will be readily seen that any tendency of the disc not to run exactly true, can be more or less overcome by tightening the deformable ring tighter on one side than on the other.

Preferably the perforations in the driven discs are relatively large to provide clearance around the bolts to permit relative movement between the hub and driven discs, this relative movement being resisted by the surface contour of the deformable rings.

This relative movement between the parts near the hub allows about one-eighth (⅛) of an inch movement at the periphery of the driven disc.

What I claim is:

1. In a clutch, a clutch member which comprises two parts, one of which is adapted to drive the other, and a yieldable element in association with the two parts, said yieldable element having an interlocking surface engagement with at least one of the parts which is effected by projecting portions on the said yieldable element, said engagement permitting limited rotational movement as between the two parts by distortion of the material of the yieldable element while not substantially compressing the same, but which resists slippage as between the yieldable element and the part thus engaged by reason of the projections.

2. In a clutch, a clutch member which comprises two parts, one of which is adapted to drive the other, a positive driving connection between the parts which permits limited relative movement between them, and a yieldable element having a connection with at least one of the parts consisting of an interlocking surface to surface engagement effected by projecting portions on the said yieldable element, which permits limited relative movement as between the two parts by distortion of the yieldable element, but which resists slippage as between the yieldable element and the thus engaged part.

3. In a clutch, a clutch member which comprises two parts, one of which is adapted to drive the other, and a yieldable element having a connection with the two parts, at least one of the connections consisting of an interlocking surface engagement effected by cooperating permanent projecting portions on the yieldable element and recesses in the engaged clutch part, which interlocking surface engagement permits limited relative rotational movement as between the two parts by distortion of the yieldable element, but which resists slippage as between the yieldable element and the thus engaged part.

4. In a clutch, the combination of a disk member, a collar member for the disc, a yieldble element clamped together with the disk member and the collar member through which driving power is normally exerted, means on the yieldable element for engaging at least one of these members, said members being arranged to have limited movement which is resisted by the said yieldable element.

5. In a clutch, the combination of a disk member, a hub provided with a collar member, a yieldable element through which driving power is normally exerted clamped together with the disk member and collar member, a positive driving connection between the disk member and the collar member, said positive connection permitting limited relative movement between the disk member and the collar member which is resisted by the said yieldable element and means on said yieldable element for engagement with at least one of the two first mentioned members.

6. In a clutch, the combination of a disk member, a hub provided with a collar member, a yieldable element clamped together with the disk member and collar member, a positive driving connection between the disk member and the collar member, said positive connection permitting limited relative movement between the disk member and the collar member which is resisted by the said yieldable element, and projections on said yieldable element for engagement with cooperating means on at least one of the two first mentioned members.

7. In a clutch, the combination of a disk member, a hub provided with a collar member, a yieldable element clamped together with the disk member and collar member, a positive driving connection between the disk member and the collar member, said positive connection permitting limited relative movement between the disk and the collar members which is resisted by the said yieldable element, and projecting spots on said yieldable element for engagement with cooperating recesses in at least one of the two first mentioned members.

8. In a clutch, the combination of a disk member, a hub having a collar member, a yieldable element of vulcanized fabric adjacent the disk and the collar, bolts for clamping these members together in such a way as to afford limited relative movement between the disk and the collar, projecting spots on the yieldable element, and cooperating apertures in one of the other members whereby slippage between the yieldable element and the disk is resisted to resist the limited relative movement between the disk and the collar.

9. In a clutch, the combination of a disk member, a collar member facing the disc, a yieldable element disposed between the disc and the collar, bolts for clamping these members and yieldable element together, the yieldable element and one of the first two mentioned members having bolt holes of substantially the same size as the cross section of the bolts, and the other of the first mentioned members having bolt holes larger than the diameter of the bolts, so that limited relative movement between the first two mentioned members is permitted, projecting spots on the yieldable element, and cooperating apertures in the said member having the large bolt holes, whereby slippage between the yieldable element and said member is resisted to resist the limited relative movement between the first two mentioned members.

10. In a clutch, the combination of a disc, a hub for the disc having a collar facing the central portion of the disc, a ring member opposite the said collar on the opposite side of the disc, yieldable elements disposed between the disc and the collar, and the disc and the ring, bolts passing through the collar, yieldable elements, disc, and ring for clamping all the parts together, the disc having openings larger than the cross section of the bolts, whereby the disc can move relative to the ring and collar, both of said yieldable elements having projections thereon, and the said disc having recesses or apertures for cooperation with the said projections whereby limited movement of the disc with respect to the ring and collar is permitted by surface distortion of the yieldable elements, but slippage between the disc and the yieldable elements being resisted by reason of the cooperating projections and recesses or apertures in the disc.

11. In a clutch, the combination of a disc, a hub for the disc having a collar facing the central portion of the disc, a ring member opposite the said collar on the opposite side of the disc, yieldable elements disposed between the disc and the collar, and the disc and the ring, bolts passing through the collar, yieldable elements, disc, and ring for clamping all the parts together, the disc having openings larger than the cross section of the bolts, whereby the disc can move relative to the ring and collar, at least one of the said yieldable elements having projections thereon, and the said disc having recesses or apertures for cooperation with the said projections whereby limited movement of the disc with respect to the ring and collar is permitted by surface distortion of the yieldable elements, but slippage between the disc and the yieldable elements being resisted by reason of the cooperating projections and recesses or apertures in the disc.

In testimony whereof I affix my signature.

RAYMOND L. HAWKINS.